United States Patent
Okamoto et al.

(10) Patent No.: US 6,874,672 B2
(45) Date of Patent: Apr. 5, 2005

(54) APPARATUS AND METHOD FOR FRICTIONAL STIRRING WELD

(75) Inventors: Kazutaka Okamoto, Hitachi (JP); Satoshi Hirano, Hitachi (JP); Masahisa Inagaki, Hitachi (JP); Tomio Odakura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/372,324

(22) Filed: Feb. 25, 2003

(65) Prior Publication Data

US 2004/0074944 A1 Apr. 22, 2004

(30) Foreign Application Priority Data

Oct. 18, 2002 (JP) .................................... 2002-303702

(51) Int. Cl.⁷ .............................................. B23K 20/12
(52) U.S. Cl. ..................................... 228/112.1; 228/2.1
(58) Field of Search .............................. 228/112.1, 2.1, 228/102, 103, 8, 9

(56) References Cited

U.S. PATENT DOCUMENTS

| | | | | |
|---|---|---|---|---|
| 5,697,544 A | * | 12/1997 | Wykes | 228/2.1 |
| 5,713,507 A | * | 2/1998 | Holt et al. | 228/112.1 |
| 5,893,507 A | * | 4/1999 | Ding et al. | 228/2.1 |
| 6,050,475 A | * | 4/2000 | Kinton et al. | 228/112.1 |
| 6,199,745 B1 | * | 3/2001 | Campbell et al. | 228/112.1 |
| 6,247,633 B1 | * | 6/2001 | White et al. | 228/112.1 |
| 6,264,088 B1 | * | 7/2001 | Larsson | 228/2.1 |
| 6,302,315 B1 | * | 10/2001 | Thompson | 228/112.1 |
| 6,421,578 B1 | * | 7/2002 | Adams et al. | 700/212 |
| 6,497,355 B1 | * | 12/2002 | Ding et al. | 228/2.1 |
| 6,732,900 B2 | * | 5/2004 | Hansen et al. | 228/2.1 |
| 2002/0027153 A1 | | 3/2002 | Savama et al. | |
| 2002/0027155 A1 | * | 3/2002 | Okamura et al. | 228/112.1 |
| 2002/0145031 A1 | | 10/2002 | Hirano et al. | |
| 2002/0179673 A1 | * | 12/2002 | Strombeck et al. | 228/1.1 |
| 2003/0028281 A1 | * | 2/2003 | Adams et al. | 700/212 |
| 2003/0098337 A1 | * | 5/2003 | Hirano et al. | 228/112.1 |

FOREIGN PATENT DOCUMENTS

| | | | |
|---|---|---|---|
| EP | 1 236 533 A1 | | 9/2002 |
| JP | 2000-135577 | | 5/2000 |
| JP | 2002346769 A | * | 12/2002 |
| SE | WO 03/064100 A1 | * | 8/2003 |
| WO | WO 02/078894 A1 | | 10/2002 |

OTHER PUBLICATIONS

European Search Report dated Feb. 16, 2004, for EP 03251172.

* cited by examiner

*Primary Examiner*—Kiley S. Stoner
(74) *Attorney, Agent, or Firm*—Antonelli, Terry, Stout & Kraus, LLP (57) ABSTRACT

In a frictional stirring weld apparatus for bonding elements with a rotary tool, a head is movable with respect to the elements to position and orient the rotary tool so that a pin of the rotary tool is aligned along a boundary between first surfaces and a shoulder of the rotary tool faces to second surfaces extending radially outward from the first surfaces, and to generate a relative movement between the rotary tool and the elements along the second surfaces, and a compensating member is capable of holding thereon the rotary tool, at least partially rotatable on the rotational axis with respect to the head to rotate the rotary tool, and supported on the head movably along the rotational axis with respect to the head so that a positional relationship between the rotary tool and a combination of the elements is adjustable in a direction parallel to the rotational axis.

15 Claims, 9 Drawing Sheets

NON- BONDED AREA

CROSS-SECTIONAL
VIEW ALONG A-A'

CROSS-SECTIONAL
VIEW ALONG B-B'

APPARATUS AND METHOD FOR
FRICTIONAL STIRRING WELD

BACKGROUND OF THE INVENTION

The present invention relates to an apparatus and method for frictional stirring weld for elements to be bonded in which apparatus and method a thermal energy is generated by a friction between a rotary tool and the elements to make the elements plastically deformable, and a stir by the rotary tool causes a connection by the plastic deformation between the elements.

In a prior art frictional stirring weld apparatus as disclosed by JP-A-11-226758 (on pages 5 and 6, and FIGS. 4 and 5), a head holding a rotary tool is not movable in each of attitude and position with respect to elements to be bonded so that the rotary tool is positioned and oriented in such a manner that a pin of the rotary tool is aligned along a boundary between first surfaces of the elements and a shoulder of the rotary tool faces to second surfaces extending radially outward from the first surfaces.

BRIEF SUMMARY OF THE INVENTION

An object of the present invention is to provide an apparatus and method for frictional stirring weld in which apparatus and method a positional relationship between a rotary tool and a combination of elements to be bonded can be adjusted easily so that a friction between the rotary tool and the elements and a stir by the rotary tool on the elements are performed securely and sufficiently for the frictional stirring weld.

A frictional stirring weld apparatus for bonding elements with a rotary tool including a pin extending along a rotational axis of the rotary tool to be inserted between first surfaces of the elements facing to each other, and a shoulder to be pressed against second surfaces of the elements extending radially outward from the first surfaces respectively, according to the present invention, comprises, a head movable with respect to the elements to position and orient the rotary tool in such a manner that the pin is aligned along a boundary between the first surfaces and the shoulder faces to the second surfaces, and to generate a relative movement between the rotary tool and the elements along the second surfaces, and a compensating member which is capable of holding thereon the rotary tool, at least partially rotatable on the rotational axis with respect to the head to rotate the rotary tool, and supported on the head movably along the rotational axis with respect to the head so that a positional relationship between at least one of the pin and shoulder and a combination of the elements is adjustable in a direction parallel to the rotational axis.

In a frictional stirring weld method for bonding elements with a rotary tool including a pin extending along a rotational axis of the rotary tool to be inserted between first surfaces of the elements facing to each other, and a shoulder to be pressed against second surfaces of the elements extending radially outward from the first surfaces respectively, the pin is inserted between the first surfaces, and a relative movement between the rotary tool and the elements along the second surfaces is generated in such a manner that the pin is aligned along a boundary between the first surfaces and the shoulder faces to the second surfaces, rotating the rotary tool on the rotational axis, and pressing the shoulder against the second surfaces, wherein a positional relationship between a head supporting thereon the rotary tool to be positioned and oriented in such a manner that the pin is arranged between the first surfaces and the shoulder faces to the second surfaces and a compensating member which holds thereon the rotary tool and is supported on the head at least partially rotatably on the rotational axis with respect to the head to rotate the rotary tool and movably along the rotational axis with respect to the head is adjusted to determine a positional relationship between at least one of the pin and shoulder and a combination of the elements in a direction parallel to the rotational axis so that the frictional stirring weld is performed between the elements.

Since the compensating member capable of holding thereon the rotary tool is at least partially rotatable on the rotational axis with respect to the head to rotate the rotary tool, and supported on the head movably along the rotational axis with respect to the head so that a positional relationship between at least one of the pin and shoulder and a combination of the elements is adjustable in a direction parallel to the rotational axis, the positional relationship between at least one of the pin and shoulder and a combination of the elements is adjusted in the direction without a movement of the head or with minimizing the movement of the head. Therefore, the positional relationship between the rotary tool and the combination of the elements can be adjusted easily while a friction between the rotary tool and the elements and a stir by the rotary tool on the elements are performed securely and sufficiently for the frictional stirring weld.

If a positional relationship detector measures an actual value corresponding to an actual positional relationship between the rotary tool and the combination of the elements in the direction, and the compensating member is movable with respect to the head along the rotational axis in such a manner that a difference between the measured actual value and a desirable value corresponding to a desirable positional relationship between the rotary tool and the combination of the elements in the direction is not more than a predetermined degree, the positional relationship between the rotary tool and the combination of the elements in the direction is kept at a desirable degree. It is preferable for easily measuring the positional relationship that the positional relationship detector is stationary with respect to the compensating member in the direction so that the positional relationship detector is movable together with the rotary tool in the direction. It is more preferable for easily and correctly measuring the positional relationship that the compensating member has a first compensating member part being rotationally stationary with respect to the head and supported on the head movably in the direction with respect to the head, and a second compensating member part being capable of holding the rotary tool, stationary with respect to the first compensating member in the direction and supported on the first compensating member part in a rotatable manner with respect to the first compensating member part on the rotational axis to rotate the rotary tool, and the positional relationship detector is stationary with respect to the first compensating member part in the direction so that the positional relationship detector is movable together with the rotary tool in the direction.

The positional relationship detector may be capable of measuring, as the actual value, one of an actual distance between the rotary tool and at least one of the elements, an actual force applied to the rotary tool, an actual power for driving the rotary tool and an actual electric current supplied to an electric motor for driving the rotary tool, and the desirable value is corresponding one of a desirable distance (corresponding to the actual distance) between the rotary tool and the at least one of the elements, a desirable force (corresponding to the actual force) to be applied to the rotary tool, a desirable power (corresponding to the actual power) for driving the rotary tool and a desirable electric current (corresponding to the actual electric power) to be supplied to the electric motor for driving the rotary tool, for example, the at least one of the pin and shoulder is moved toward or urged more strongly into the elements along the rotational axis, when the actual distance is significantly more than the desirable distance, the actual force for keeping the rotation on the rotational axis, press against the elements and/or movement along the second surface is significantly less than the desirable force, the actual power for keeping the rotation on the rotational axis, press against the elements and/or movement along the second surface is significantly less than the desirable power and/or the actual electric current for keeping the rotation on the rotational axis, press against the elements and/or movement along the second surface is significantly less than the desirable actual electric current. In this case, when one of the actual distance between the rotary tool and at least one of the elements, the actual force applied to the rotary tool, the actual power for driving the rotary tool and the actual electric current supplied to an electric motor for driving the rotary tool is measured as the actual value, and the desirable value is corresponding one of the desirable distance between the rotary tool and the at least one of the elements, the desirable force to be applied to the rotary tool, the desirable power for driving the rotary tool and the desirable electric current to be supplied to the electric motor for driving the rotary tool, it is preferable that at least one of a rotational velocity of the rotary tool, a velocity of the rotary tool along the second surface and a velocity of the rotary tool in a direction perpendicular to the second surface or parallel to the rotational axis is kept substantially constant or as constant as possible.

If the positional relationship detector is stationary with respect to the compensating member in the direction so that the positional relationship detector is movable together with the rotary tool in the direction, the positional relationship detector may measure, as the actual distance between the rotary tool and the at least one of the elements, an actual distance between the positional relationship detector and the at least one of the elements, and the desirable distance between the rotary tool and the at least one of the elements may be a desirable distance between the positional relationship detector and the at least one of the elements. The positional relationship detector may measure, as the actual force, one of an actual torque for driving rotationally the rotary tool and an actual force applied to the rotary tool in the direction, and the desirable force may be corresponding one of a desirable torque (corresponding to the actual torque) for driving rotationally the rotary tool and a desirable force (corresponding to the actual force in the direction) to be applied to the rotary tool in the direction. In this case, when the positional relationship detector measures, as the actual force, one of the actual torque for driving rotationally the rotary tool and the actual force applied to the rotary tool in the direction, and the desirable force is corresponding one of the desirable torque for driving rotationally the rotary tool and the desirable force to be applied to the rotary tool in the direction, it is preferable that at least one of the rotational velocity of the rotary tool, the velocity of the rotary tool along the second surface and the velocity of the rotary tool in the direction perpendicular to the second surface or parallel to the rotational axis is kept substantially constant or as constant as possible.

It is preferable for keeping an integrity of welded joint irrespective of a variation in thickness of the elements, that is, a desirable depth of the pin in the elements or a desirable protrusion length of the pin from the shoulder pressed against the second surfaces that the pin and the shoulder are separable from each other to be movable along the rotational axis with respect to each other, the compensating member has a pin holder being capable of holding thereon, rotatable on the rotational axis with respect to the head to rotate the pin, and supported on the head, and a shoulder holder being capable of holding thereon the shoulder, rotatable on the rotational axis with respect to the head to rotate the shoulder, and supported on the head, and at least one of the pin holder and the shoulder holder is supported on the head movably in the direction with respect to the head so that a positional relationship between the shoulder and the pin is adjustable in the direction. The at least one of the pin holder and the shoulder holder may be movable along the rotational axis with respect to the head to adjust the positional relationship between the shoulder and the pin in the direction in such a manner that one of a difference between an actual electric current supplied to an electric motor for driving rotationally the pin holder and a desirable electric current to be supplied to the electric motor for driving rotationally the pin holder, a difference between an actual torque for driving rotationally the pin holder and a desirable torque for driving rotationally the pin holder and a difference between an actual temperature of a front end of the pin and a desirable temperature of the front end of the pin is not more than a predetermined degree, for example, the at least one of the pin holder and the shoulder holder is moved toward or urged into the elements when the actual electric current for keeping the rotation of the pin holder is significantly less than the desirable electric current, the actual torque for keeping the rotation of the pin holder is significantly less than the desirable torque and/or the actual temperature of the front end of the pin is significantly less than the desirable temperature. Also in this case, it is preferable that at least one of the rotational velocity of the rotary tool, the velocity of the rotary tool along the second surface and the velocity of the rotary tool in the direction perpendicular to the second surface or parallel to the rotational axis is kept substantially constant or as constant as possible.

It is preferable for easily controlling the movement of head and/or the compensating member that relative movements in a direction traversing the direction between the compensating member and the rotary tool and between the compensating member and the head, and a swing motion of the rotational axis with respect to the head are prevented irrespective of an orientation of the rotational axis, that is, even when the orientation of the rotational axis can be changeable desirably, or the head is movable in both attitude and position with respect to the elements.

Other objects, features and advantages of the invention will become apparent from the following description of the embodiments of the invention taken in conjunction with the accompanying drawings.

DETAILED DESCRIPTION OF THE INVENTION

Embodiment 1

Figure 2:
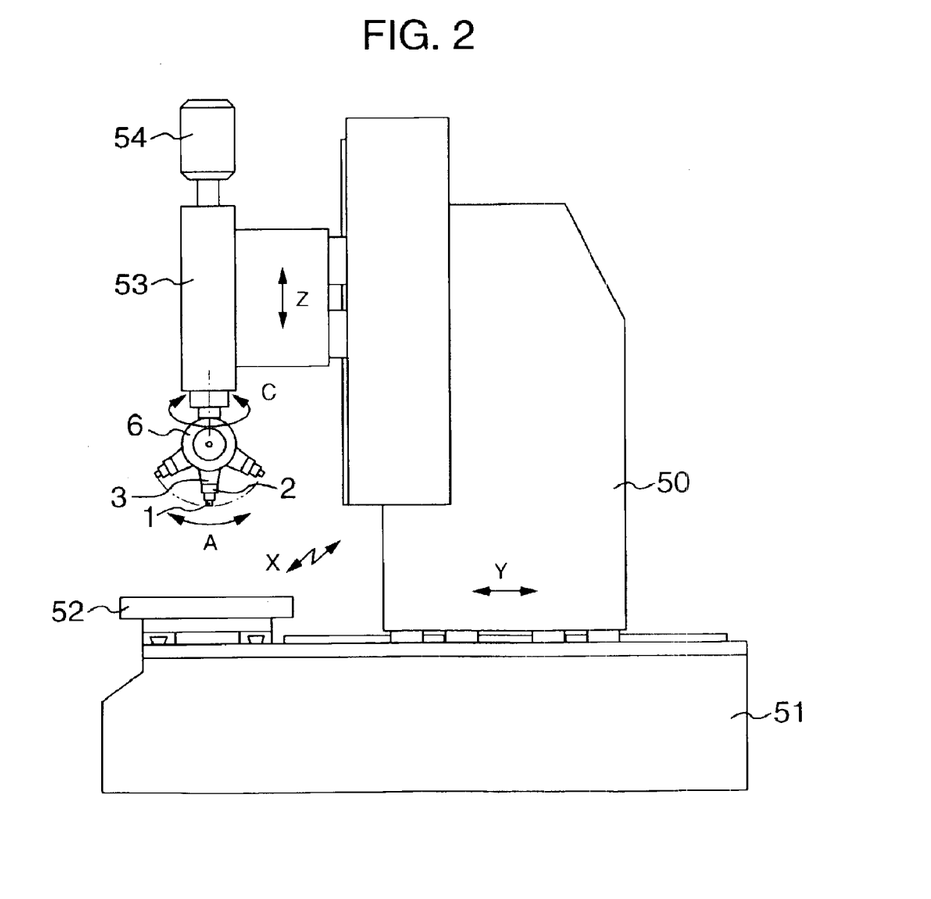
FIG. 2 is a schematic view showing a compensating member of the present invention with the rotary tool thereon and the head attached to a welding machine.

A frictional stirring weld (FSW) apparatus of column-type having five axes for movements as shown in FIG. 2 includes three axes X, Y and Z for straight movements perpendicular to each other, an axis for rotational movement C which axis is parallel to the axis Z, and an axis for rotational movement A which axis is perpendicular to the axis for rotational movement C. Since a rotary tool 1 of the FSW apparatus is pressed by a significantly great force into a boundary between elements 7 to be bonded, the FSW apparatus needs to have a significantly great rigidity against the significantly great force. The force for pressing the rotary tool into the boundary varies in accordance with a kind of the elements 7, a thickness of the elements 7, an outer shape of the rotary tool 1, a rotational velocity of the rotary tool 1, a proceeding velocity of the rotary tool 1 along the elements 7 and so forth, and particularly increases in accordance with an increase of the thickness of the elements 7. In the FSW apparatus, a column 50 is movable on a base 51 in a direction parallel to the axis Y, a work piece table 52 is movable on the base 51 in a direction parallel to the axis X, and a head block 53 is movable on the column 50 in a direction parallel to the axis Z. A head 6 supported by the head block 53 is rotatable by a servo-motor 8 on the axis for rotational movement C and on the axis for rotational movement A. The rotary tool 1 is rotationally driven by a motor 54, and is supported by the head 6 through a combination of a shift member 3 (as the claimed first compensating member part) and a rotatable spindle 2 (as the claimed compensating member or the claimed second compensating member part) so that a positional relationship between the rotary tool 1 and the elements 7 is adjusted in a direction parallel to a rotational axis of the rotary tool 1 between the rotary tool 1 and the head 6.

Figure 1:
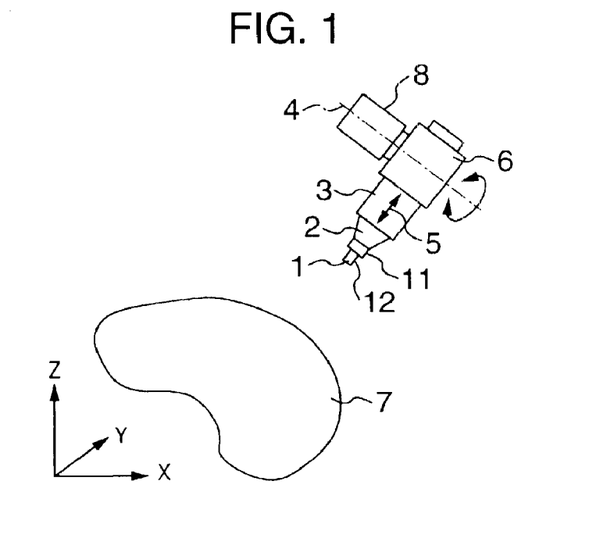
FIG. 1 is a schematic view showing a compensating member of the present invention with a rotary tool thereon, and a head.

As shown in FIG. 1, the rotary tool 1 including a pin 12 and a shoulder 11 is detachably fixed to the spindle 2 while a rotational axis of the rotary tool 1 and that of the spindle 2 are identical to each other, the spindle 2 is rotatably supported on the shift member 3 and stationarily with respect to the shift member 3 in the direction, and the shift member 3 is supported on the head 6 movably in the direction parallel to the common rotational axis of the rotary tool 1 and the spindle 2 and rotationally stationarily with respect to the head 6, so that the rotary tool 1 is movable along the rotational axis with respect to the head 6 to adjust a positional relationship between the rotary tool 1 and the elements 7 in the direction. The shift member 3 may be moved with respect to the head 6 in the direction by a mechanical drive, a hydraulic drive or an electric drive.

Figure 3:
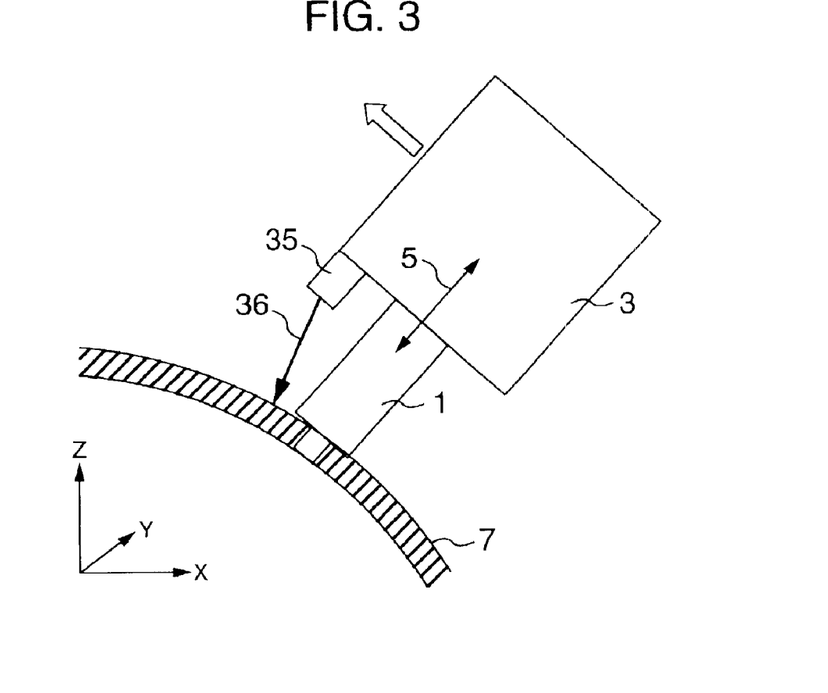
FIG. 3 is a partially cross-sectional view showing another compensating member of the present invention with the rotary tool and a positional relationship detector thereon.

As shown in FIG. 3, a distance between a laser distance detector 35 and one of the elements 7 corresponding to an actual positional relationship between the rotary tool 1 and the elements 7 in the direction may be detected by the laser distance detector 35 fixed to the shift member 3 while irradiating a laser beam 36 from the laser distance detector 35 to the one of the elements 7 and receiving into the laser distance detector 35 the laser beam 36 reflected by the one of the elements 7. The shift member 3 is moved with respect to the head 6 in the direction in such a manner that a difference between the measured distance and a desirable distance between the laser distance detector 35 and the one of the elements 7 corresponding to a desirable positional relationship between the rotary tool 1 and the elements 7 in the direction is not more than a predetermined degree, for example, ±0.05 mm. Since the positional relationship between the rotary tool 1 and the elements 7 in the direction is adjusted by the movement of the shift member 3 in the direction, a movement of the head 6 for the desirable positional relationship between the rotary tool 1 and the elements 7 in the direction and/or calculation for determining the movement of the head 6 for the desirable positional relationship between the rotary tool 1 and the elements 7 in the direction can be minimized.

Alternatively, the actual positional relationship between the rotary tool 1 and the elements 7 in the direction may be estimated from or corresponds to (be substantially in proportion to) an actual force (torque or force in the direction) applied to the rotary tool 1, an actual (electric or mechanical) power (output from or input into a motor) for driving rotationally the rotary tool 1 and/or moving the rotary tool 1 along the rotational axis, or an actual electric current supplied to an electric motor for driving rotationally the rotary tool and/or moving the rotary tool 1 along the rotational axis, and the desirable positional relationship between the rotary tool 1 and the elements 7 in the direction corresponds to a desirable force (torque or force in the direction) to be applied to the rotary tool 1, a desirable power for driving rotationally the rotary tool and/or moving the rotary tool 1 along the rotational axis, or a desirable electric current to be supplied to the electric motor for driving rotationally the rotary tool and/or moving the rotary tool 1 along the rotational axis. The shift member 3 is moved with respect to the head 6 in the direction in such a manner that a difference between the actual positional relationship between the rotary tool 1 and the elements 7 in the direction and the desirable positional relationship between the rotary tool 1 and the elements 7 in the direction is not more than the predetermined degree.

Figure 4:
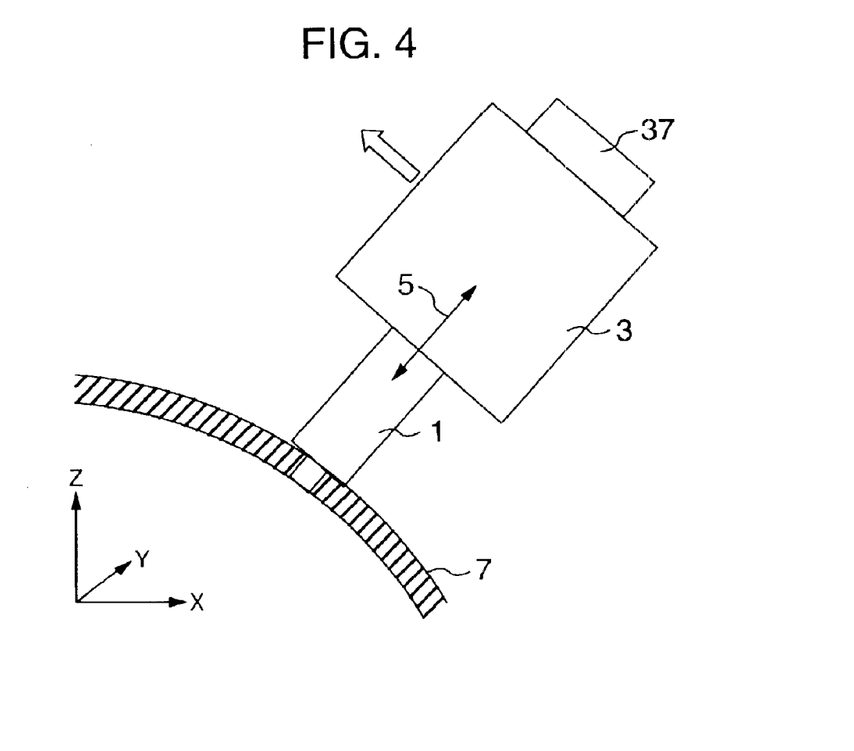
FIG. 4 is a partially cross-sectional view showing another compensating member of the present invention with the rotary tool and another positional relationship detector thereon.

As shown in FIG. 4, the actual force (torque or force in the direction) applied to the rotary tool 1 may be measured by a load cell 37 arranged between the shift member 3 and the head 6.

Embodiment 2

Figure 5:
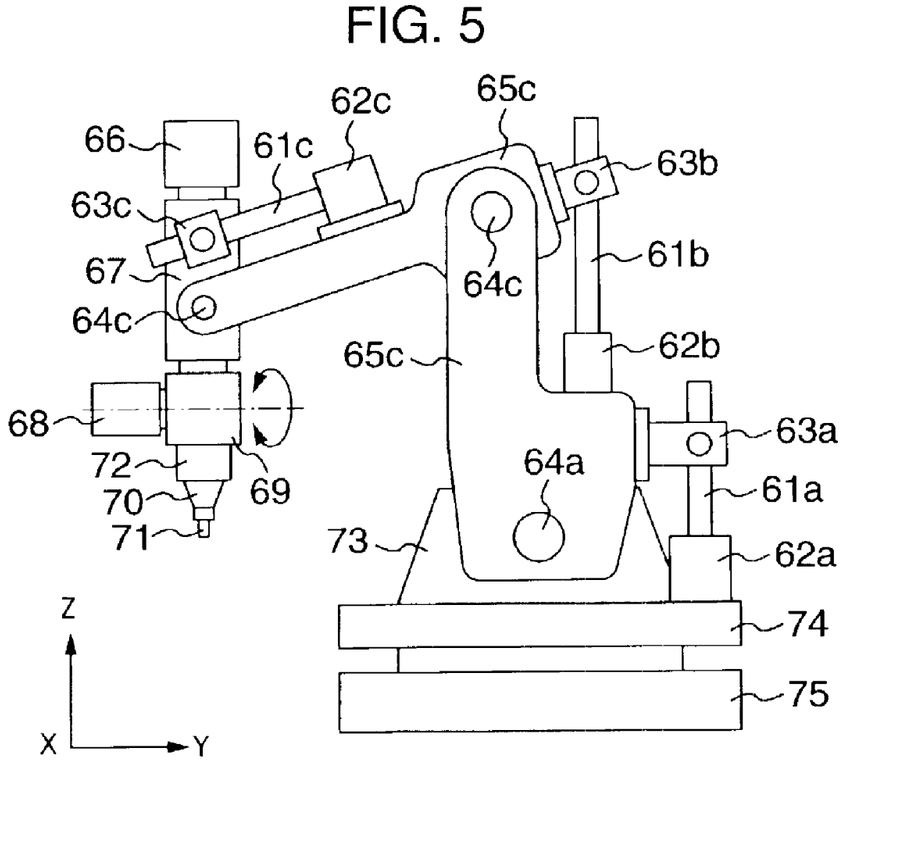
FIG. 5 is a schematic view showing another compensating member of the present invention with the rotary tool thereon and the head attached to another welding machine.

As shown in FIG. 5, a shift member 72, a rotatable spindle 70 an a rotary tool 71 may be mounted a head 69 as an end of a robot arm 67. The spindle 70 is rotationally driven by a motor 66, and the head 69 is rotationally driven on the arm 67 by a motor 68 around a swing axis perpendicular to the rotational axis of the rotary tool 71. The arm 67 is rotatable on an axis 64c perpendicular to the swing axis on an arm 65b, the arm 65b is rotatable on an axis 64b parallel to the axis 64c on an arm 65a, the arm 65a is rotatable on an axis 64a parallel to the axis 64c on a support member 73 of a rotary table 74, and the rotary table 74 is rotatable on a base 75. The arm 67 is rotationally driven with respect to the arm 65b by a rotary motor 62c, a ball screw 61c driven by the motor 62c, and a bearing joint 63c, the arm 65b is rotationally driven with respect to the arm 65a by a rotary motor 62b, a ball screw 61b driven by the motor 62b, and a bearing joint 63b, and the arm 65a is rotationally driven with respect to the support member 73 by a rotary motor 62a, a ball screw 61a driven by the motor 62a, and a bearing joint 63a.

Embodiment 3

Figure 6:
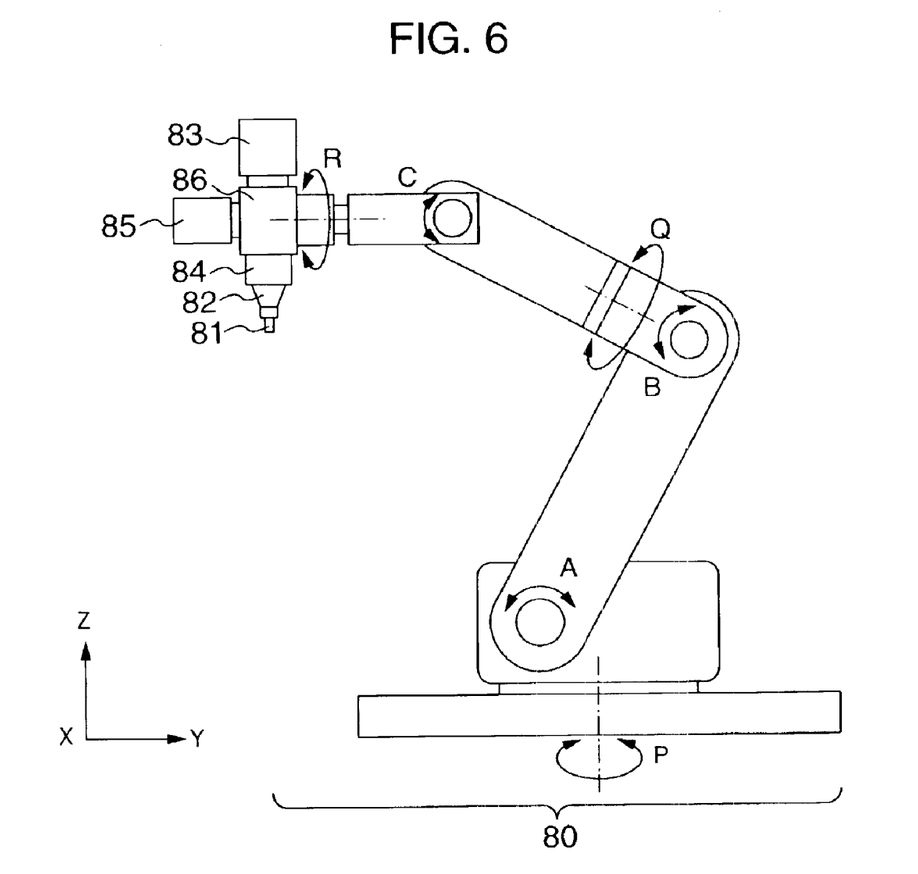
FIG. 6 is a schematic view showing another compensating member of the present invention with the rotary tool thereon and the head attached to another welding machine.

As shown in FIG. 6, a shift member 84, a rotatable spindle 82 an a rotary tool 81 may be mounted a head 86 as an end of a first arm of a robot 80. The spindle 82 is rotationally driven by a motor 83, and the head 86 is rotationally driven on the first arm by a motor 85 around a swing axis perpendicular to the rotational axis of the rotary tool 81. The first arm is rotatable on an axis C perpendicular to the swing axis on a second arm, the second arm is rotatable on an axis Q perpendicular to the axis C on a third arm, the third arm is rotatable on an axis B parallel to the axis C on a fourth arm 73, and the fourth arm is rotatable on an axis A parallel to the axis C on a rotary table rotatable on an axis P perpendicular to the axis C.

Embodiment 4

Figure 7:
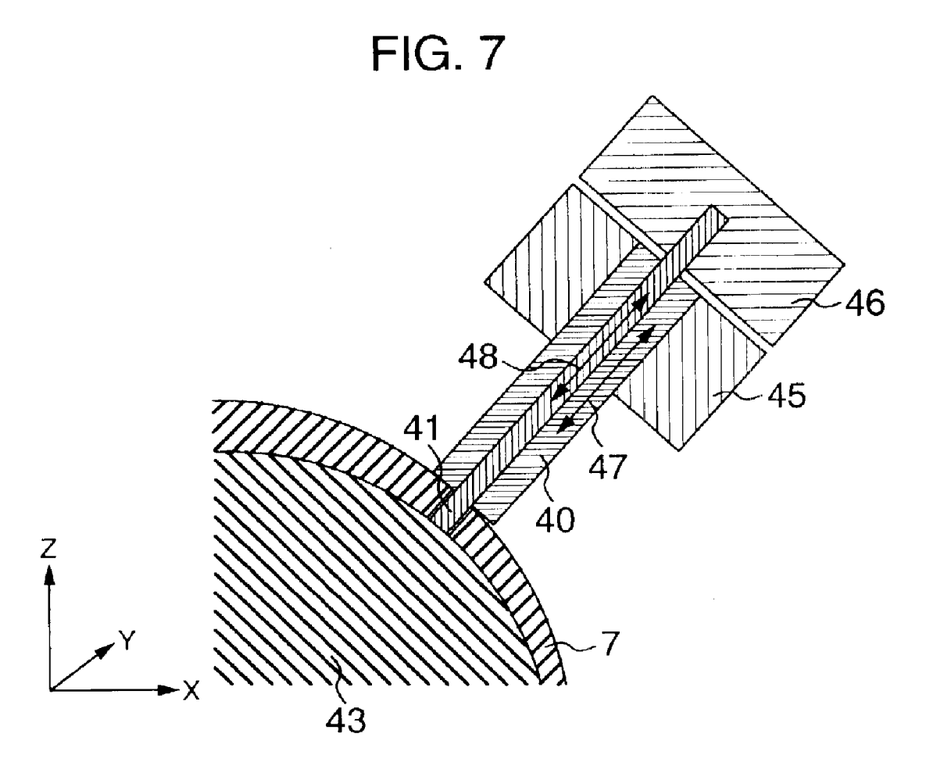
FIG. 7 is a cross-sectional view showing another compensating member of the present invention with the rotary tool thereon.

In an embodiment of the invention as shown in FIG. 7, a pin 41 and a shoulder 40 of a rotary tool is separated from each other, the pin 41 is fixed to a first spindle shifter 64 as the claimed pin holder rotatable on the rotational axis of the pin 41 with respect to the head to rotate the pin 41, and supported on the head movably along the rotational axis with respect to the head so that a positional relationship between the pin 41 and the elements 7 supported on a jig 43 is adjustable in a direction parallel to the rotational axis to keep an integrity of welded joint irrespective of a variation in thickness of the elements 7, the shoulder 40 is fixed to a second spindle shifter 45 as the claimed shoulder holder rotatable on the rotational axis of the shoulder 40 with respect to the head to rotate the shoulder 40, and supported on the head movably along the rotational axis with respect to the head so that a positional relationship between the shoulder 40 and the elements 7 supported on the jig 43 is adjustable in the direction parallel to the rotational axis to keep the integrity of welded joint irrespective of the variation in thickness of the elements 7, and the rotational axes of the pin 41 and shoulder 40 are identical to each other, so that the positional relationship between the pin 41 and the elements 7 supported in the direction and the positional relationship between the shoulder 40 and the elements 7 in the direction can be adjusted independent of each other.

Figure 8:
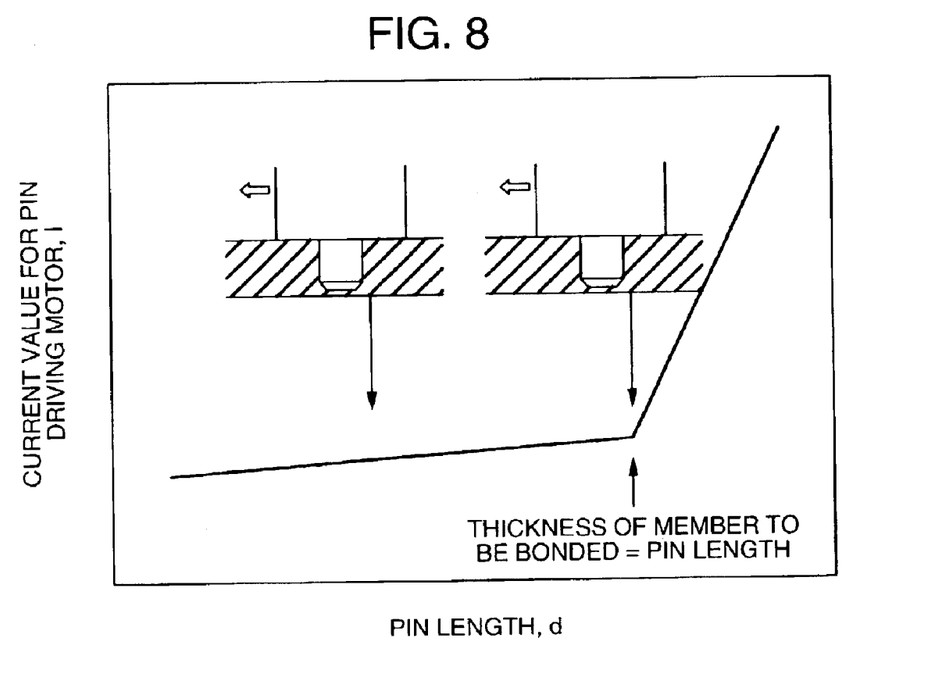
FIG. 8 is a diagram showing an experimentally obtained relationship between an electric current for rotationally driving a pin, and a pin protrusion length relative to a thickness of elements to be bonded.
Figure 10:
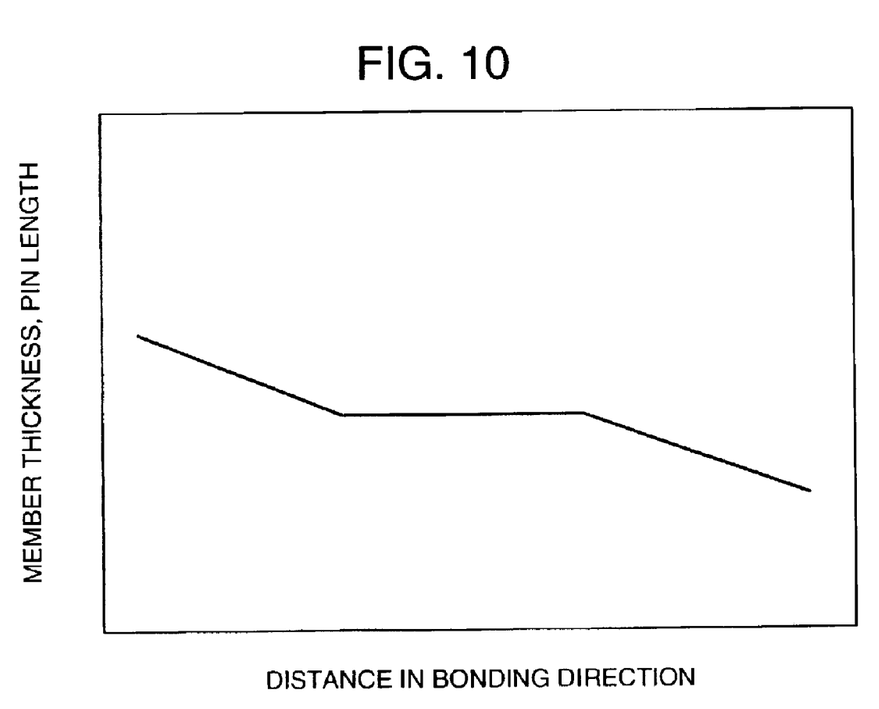
FIG. 10 is an experimentally obtained relationship among a moved distance of the rotary tool in a direction perpendicular to a rotational axis of the rotary tool, the thickness of the elements and the pin protrusion length.

As shown in FIG. 8, the electric current I supplied to a motor for driving rotationally the pin 41 increases gradually in accordance with an increase of a depth d of a front end of the pin 41 from an open surface of the elements 7 or a protruding length d of the pin 41 from the shoulder 40 pressed against the open surface of the elements 7 before the front end of the pin 41 reaches the jig 7, and increases abruptly in accordance with the increase of the protruding length d of the pin 41 from the shoulder 40 when and after the front end of the pin 41 reaches the jig 7. Therefore, the protruding length d of the pin 41 from the shoulder 40 is adjusted in such a manner that a difference between the electric current I actually supplied to the motor and a desirable electric current to be supplied to the motor just before the front end of the pin 41 reaches the jig 7 is not more than a predetermined degree so that the depth d of the front end of the pin 41 from the open surface of the elements 7 is kept sufficiently great for the integrity of welded joint, that is, a difference between the depth d of the front end of the pin 41 from the open surface of the elements 7 and the actual thickness of the elements 7 is significantly small as shown in FIG. 10 and the front end of the pin 41 is prevented from reaching the jig 7. A torque may be supplied to each of the first and second spindle shifters 64 and 65 through a spline drive connection along the rotational axis, and the each of the first and second spindle shifters 64 and 65 may be driven along the rotational axis by a linear motor.

Figure 9:
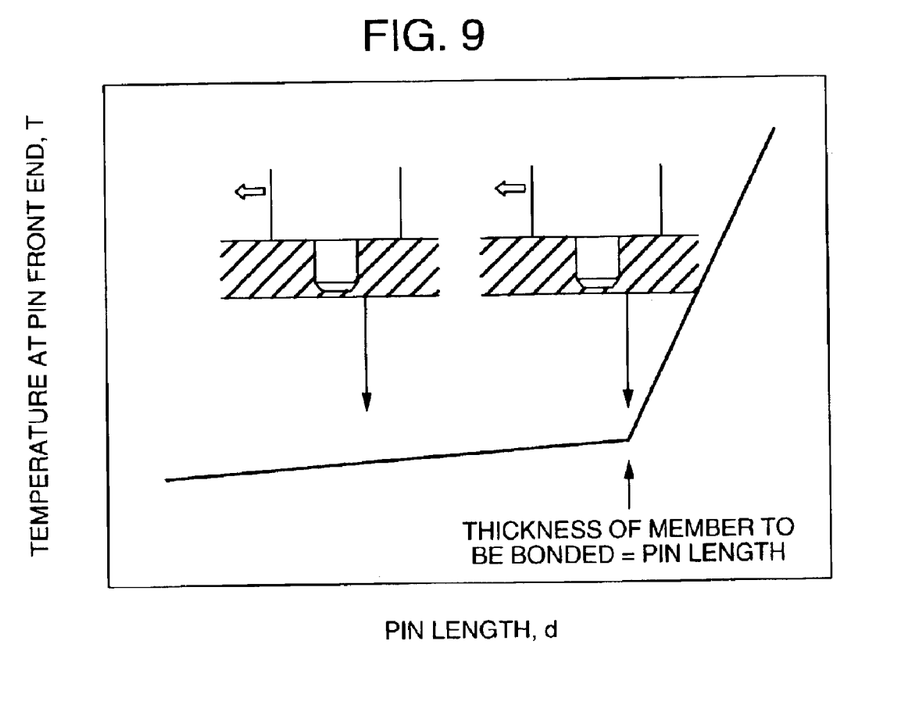
FIG. 9 is a diagram showing an experimentally obtained relationship between a temperature of a front end of the pin, and the pin protrusion length relative to the thickness of the elements to be bonded.

As shown in FIG. 9, a temperature of the front end of the pin 41 increases gradually in accordance with the increase of the depth d of the front end of the pin 41 from the open surface of the elements 7 or the protruding length d of the pin 41 from the shoulder 40 pressed against the open surface of the elements 7 before the front end of the pin 41 reaches the jig 7, and increases abruptly in accordance with the increase of the protruding length d of the pin 41 from the shoulder 40 when and after the front end of the pin 41 reaches the jig 7. Therefore, the protruding length d of the pin 41 from the shoulder 40 is adjusted in such a manner that a difference between the actual temperature of the front end of the pin 41 and a desirable temperature of the front end of the pin 41 just before the front end of the pin 41 reaches the jig 7 is not more than a predetermined degree so that the depth d of the front end of the pin 41 from the open surface of the elements 7 is kept sufficiently great for the integrity of welded joint, that is, the difference between the depth d of the front end of the pin 41 from the open surface of the elements 7 and the actual thickness of the elements 7 is significantly small as shown in FIG. 10 and the front end of the pin 41 is prevented from reaching the jig 7.

Figure 11:
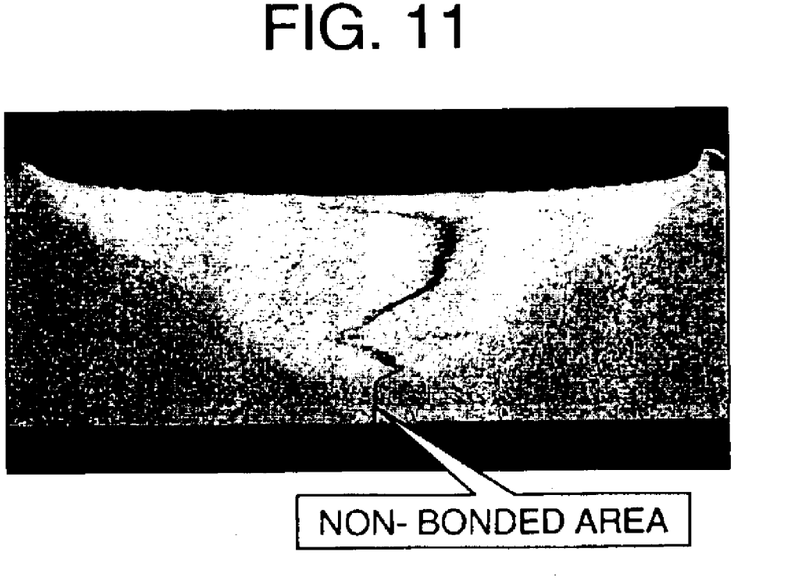
FIG. 11 is a cut view of welded area obtained when the pin protrusion length is not adjusted relative to the thickness of the elements to be bonded.
Figure 12:
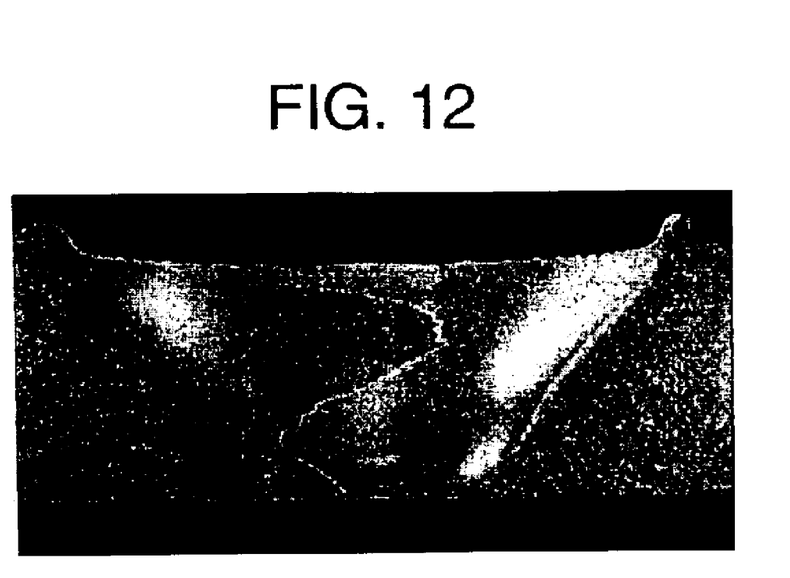
FIG. 12 is a cut view of welded area obtained when the pin protrusion length is adjusted relative to the thickness of the elements to be bonded.

As shown in FIG. 11, if the depth d of the front end of the pin 41 from the open surface of the elements 7 is not sufficient, the integrity of welded joint is deteriorated. As shown in FIG. 12, if the depth d of the front end of the pin 41 from the open surface of the elements 7 is sufficient, the integrity of welded joint is kept.

Embodiment 5

Figure 13:
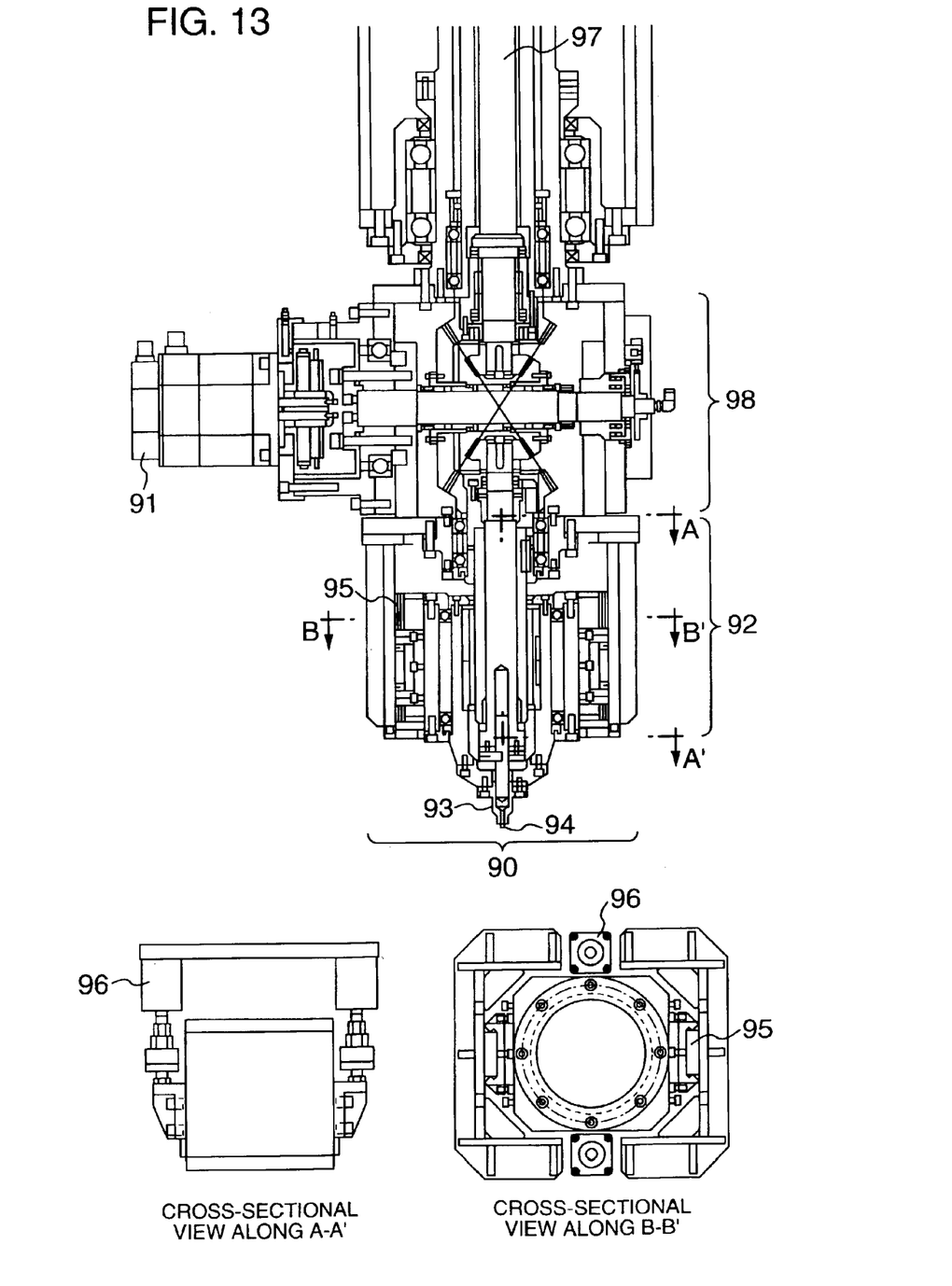
FIG. 13 includes a cross-sectional view of the head and the compensating member of the present invention with the rotary tool thereon on which compensating member the pin protrusion length from a shoulder of the rotary tool can be desirably adjusted, a cross-sectional view showing an axially driving mechanism of the compensating member, and a cross-sectional view showing the axially driving mechanism and a compensating member guide mechanism.

As shown in FIG. 13, a head 98 is rotatable by a servo-motor 91 through a servo-gear train incorporated in the head 98. A rotary tool 90 is mechanically connected to the head 98 through a compensating mechanism 92, and is rotationally driven by a shaft 97. The rotary tool 90 includes a pin 94 and a shoulder 93 separable from each other so that the coaxial pin 94 and shoulder 93 can move along a rotational axis of the rotary tool 90 independent of each other. As shown in a cross sectional view along A—A in FIG. 13, the shoulder 93 can be moved along a guide 95 parallel to the rotational axis by a hydraulic cylinder 96 in the compensating mechanism 92 independent of the pin 94 to change the protruding length d of the pin 94 relative to the shoulder 93. The pin 94 may be non-movable with respect to the head along the rotational axis, because the protruding length d of the pin 94 from the shoulder 93 can be adjusted by the movement of the shoulder 93 with respect to the head along the rotational axis.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A frictional stirring weld apparatus for bonding elements with a rotary tool including a pin extending along a rotational axis of the rotary tool to be inserted between first surfaces of the elements facing to each other, and a shoulder to be pressed against second surfaces of the elements extending radially outward from the first surfaces respectively, comprising, a head movable with respect to the elements to position and orient the rotary tool in such a manner that the pin is aligned along a boundary between the first surfaces and the shoulder faces to the second surfaces, and to generate a relative movement between the rotary tool and the elements along the second surfaces, a compensating member which is capable of holding thereon the rotary tool, at least partially rotatable on the rotational axis with respect to the head to rotate the rotary tool, and supported on the head movably along the rotational axis with respect to the head so that a positional relationship between at least one of the pin and shoulder and a combination of the elements is adjustable in a direction parallel to the rotational axis; and a positional relationship detector for measuring an actual value corresponding to an actual positional relationship between the rotary tool and the combination of the elements in the direction, wherein the compensating member is movable with respect to the head along the rotational axis in such a manner that a difference between the measured actual value and a desirable value corresponding to a desirable positional relationship between the rotary tool and the combination of the elements in the direction is not more than a predetermined degree, and wherein the positional relationship detector is stationary with respect to the compensating member in the direction so that the positional relationship detector is movable together with the rotary tool in the direction.

2. A frictional stirring weld apparatus according to claim 1, wherein the compensating member has a first compensating member part being rotationally stationary with respect to the head and supported on the head movably in the direction with respect to the head, and a second compensating member part being capable of holding the rotary tool, stationary with respect to the first compensating member in the direction and supported on the first compensating member part in a rotatable manner with respect to the first compensating member part on the rotational axis to rotate the rotary tool, and the positional relationship detector is stationary with respect to the first compensating member part in the direction so that the positional relationship detector is movable together with the rotary tool in the direction.

3. A frictional stirring weld apparatus for bonding elements with a rotary tool including a pin extending along a rotational axis of the rotary tool to be inserted between first surfaces of the elements facing to each other, and a shoulder to be pressed against second surfaces of the elements extending radially outward from the first surfaces respectively, comprising, a head movable with respect to the elements to position and orient the rotary tool in such a manner that the pin is aligned along a boundary between the first surfaces and the shoulder faces to the second surfaces, and to generate a relative movement between the rotary tool and the elements along the second surfaces, a compensating member which is capable of holding thereon the rotary tool, at least partially rotatable on the rotational axis with respect to the head to rotate the rotary tool, and supported on the head movably along the rotational axis with respect to the head so that a positional relationship between at least one of the pin and shoulder and a combination of the elements is adjustable in a direction parallel to the rotational axis; and a positional relationship detector for measuring an actual value corresponding to an actual positional relationship between the rotary tool and the combination of the elements in the direction, wherein the compensating member is movable with respect to the head along the rotational axis in such a manner that a difference between the measured actual value and a desirable value corresponding to a desirable positional relationship between the rotary tool and the combination of the elements in the direction is not more than a predetermined degree, and wherein the positional relationship detector is capable of measuring, as the actual value, one of an actual distance between the rotary tool and at least one of the elements, an actual torque for rotationally driving the rotary tool, an actual power for driving the rotary tool and an actual electric current supplied to an electric motor for driving the rotary tool, and the desirable value is a corresponding one of a desirable distance between the rotary tool and the at least one of the elements, a desirable torque for rotationally driving the rotary tool, a desirable power for driving the rotary tool and a desirable electric current to be supplied to the electric motor for driving the rotary tool.

4. A frictional stirring weld apparatus according to claim 1, wherein the positional relationship detector is capable of measuring, as the actual value, an actual distance between the positional relationship detector and the at least one of the elements, and the desirable distance between the rotary tool and the at least one of the elements is a desirable distance between the positional relationship detector and the at least one of the elements.

5. A frictional stirring weld apparatus for bonding elements with a rotary tool including a pin extending along a rotational axis of the rotary tool to be inserted between first surfaces of the elements facing to each other, and a shoulder to be pressed against second surfaces of the elements extending radially outward from the first surfaces respectively, comprising:

a head movable with respect to the elements to position and orient the rotary tool in such a manner that the pin is aligned along a boundary between the first surfaces and the shoulder faces to the second surfaces, and to generate a relative movement between the rotary tool and the elements along the second surfaces, and a compensating member which is capable of holding thereon the rotary tool, at least partially rotatable on the rotational axis with respect to the head to rotate the rotary tool, and supported on the head movably along the rotational axis with respect to the head so that a positional relationship between at least one of the pin and shoulder and a combination of the elements is adjustable in a direction parallel to the rotational axis;

wherein the pin and the shoulder are separable from each other to be movable along the rotational axis with respect to each other, the compensating member has a pin holder being capable of holding the pin thereon, rotatable on the rotational axis with respect to the head to rotate the pin, and supported on the head, and a shoulder holder being capable of holding thereon the shoulder, rotatable on the rotational axis with respect to the head to rotate the shoulder, and supported on the head, and at least one of the pin holder and the shoulder holder is supported on the head movably in the direction with respect to the head so that a positional relationship between the shoulder and the pin is adjustable in the direction.

6. A frictional stirring weld apparatus according to claim 5, wherein the at least one of the pin holder and the shoulder holder is movable along the rotational axis with respect to the head to adjust the positional relationship between the shoulder and the pin in the direction in such a manner that one of a difference between an actual electric current supplied to an electric motor for driving rotationally the pin holder and a desirable electric current to be supplied to the electric motor for driving rotationally the pin holder, a difference between an actual torque for driving rotationally the pin holder and a desirable torque for driving rotationally the pin holder and a difference between an actual temperature of a front end of the pin and a desirable temperature of the front end of the pin is not more than a predetermined degree.

7. A frictional stirring weld apparatus according to claim 1, wherein relative movements in a direction traversing the direction between the compensating member and the rotary tool and between the compensating member and the head, and a swing motion of the rotational axis with respect to the head are prevented irrespective of an orientation of the rotational axis.

8. A frictional stirring weld apparatus according to claim 1, wherein the head is movable in both attitude and position with respect to the elements.

9. A frictional stirring weld method for bonding elements with a rotary tool including a pin extending along a rotational axis of the rotary tool to be inserted between first surfaces of the elements facing to each other, and a shoulder to be pressed against second surfaces of the elements extending radially outward from the first surfaces respectively, comprising the steps of:

inserting the pin between the first surfaces, and generating a relative movement between the rotary tool and the elements along the second surfaces in such a manner that the pin is aligned along a boundary between the first surfaces and the shoulder faces to the second surfaces, while rotating the rotary tool on the rotational axis, and pressing the shoulder against the second surfaces, wherein a positional relationship between a head supporting thereon the rotary tool to be positioned and oriented in such a manner that the pin is arranged between the first surfaces and the shoulder faces to the second surfaces and a compensating member which holds thereon the rotary tool and is supported on the head at least partially rotatably on the rotational axis with respect to the head to rotate the rotary tool and movably along the rotational axis with respect to the head is adjusted to determine a positional relationship between at least one of the pin and shoulder and a combination of the elements in a direction parallel to the rotational axis so that the frictional stirring weld is performed between the elements, and measuring an actual value corresponding to an actual positional relationship between the rotary tool and the combination of the elements in the direction, wherein the compensating member is moved with respect to the head along the rotational axis in such a manner that a difference between the measured actual value and a desirable value corresponding to a desirable positional relationship between the rotary tool and the combination of the elements in the direction is not more than a predetermined degree.

10. A frictional stirring weld method according to claim 9, wherein one of an actual distance between the rotary tool and at least one of the elements, an actual force applied to the rotary tool, an actual power for driving the rotary tool and an actual electric current supplied to an electric motor for driving the rotary tool is measured as the actual value, and the desirable value is corresponding one of a desirable distance between the rotary tool and the at least one of the elements, a desirable force to be applied to the rotary tool, a desirable power for driving the rotary tool and a desirable electric current to be supplied to the electric motor for driving the rotary tool.

11. A frictional stirring weld method according to claim 9, wherein one of an actual torque for driving rotationally the rotary tool and an actual force applied to the rotary tool in the direction is measured as the actual force, and the desirable force is corresponding one of a desirable torque for driving rotationally the rotary tool and a desirable force to be applied to the rotary tool in the direction.

12. A frictional stirring weld for bonding elements with a rotary tool including a pin extending along a rotational axis of the rotary tool to be inserted between first surfaces of the elements facing to each other, and a shoulder to be pressed against second surfaces of the elements extending radially outward from the first surfaces respectively, comprising the steps of:

inserting the pin between the first surfaces, and generating a relative movement between the rotary tool and the elements along the second surfaces in such a manner that the pin is aligned along a boundary between the first surfaces and the shoulder faces to the second surfaces, while rotating the rotary tool on the rotational axis, and pressing the shoulder against the second surfaces, wherein a positional relationship between a head supporting thereon the rotary tool to be positioned and oriented in such a manner that the pin is arranged between the first surfaces and the shoulder faces to the second surfaces and a compensating member which holds thereon the rotary tool and is supported on the head at least partially rotatably on the rotational axis with respect to the head to rotate the rotary tool and movably along the rotational axis with respect to the head is adjusted to determine a positional relationship between at least one of the pin and shoulder and a combination of the elements in a direction parallel to the rotational axis so that the frictional stirring weld is performed between the elements, and wherein the pin and the shoulder are separable from each other to be movable along the rotational axis with respect to each other, the compensating member has a pin holder being capable of holding the pin thereon, rotatable on the rotational axis with respect to the head to rotate the pin, and supported on the head, and a shoulder holder being capable of holding thereon the shoulder, rotatable on the rotational axis with respect to the head to rotate the shoulder, and supported on the head, and at least one of the pin holder and the shoulder holder is supported on the head movably in the direction with respect to the head so that a positional relationship between the shoulder and the pin is adjustable in the direction.

13. A frictional stirring weld method according to claim 12, wherein the at least one of the pin holder and the shoulder holder is movable along the rotational axis with respect to the head to adjust the positional relationship between the shoulder and the pin in the direction in such a manner that one of a difference between an actual electric current supplied to an electric motor for driving rotationally the pin holder and a desirable electric current to be supplied to the electric motor for driving rotationally the pin holder, a difference between an actual torque for driving rotationally the pin holder and a desirable torque for driving rotationally the pin holder and a difference between an actual temperature of a front end of the pin and a desirable temperature of the front end of the pin is not more than a predetermined degree.

14. A frictional stirring weld method according to claim 9, wherein relative movements in a direction traversing the direction between the compensating member and the rotary tool and between the compensating member and the head and the head, and a swing motion of the rotational axis with respect to the head are prevented irrespective of an orientation of the rotational axis.

15. A frictional stirring weld method according to claim 9, wherein the head is movable in both attitude and position with respect to the elements.

* * * * *